No. 866,337. PATENTED SEPT. 17, 1907.
J. T. COWLEY.
CONVEYING APPARATUS.
APPLICATION FILED MAY 1, 1905.
4 SHEETS—SHEET 1.
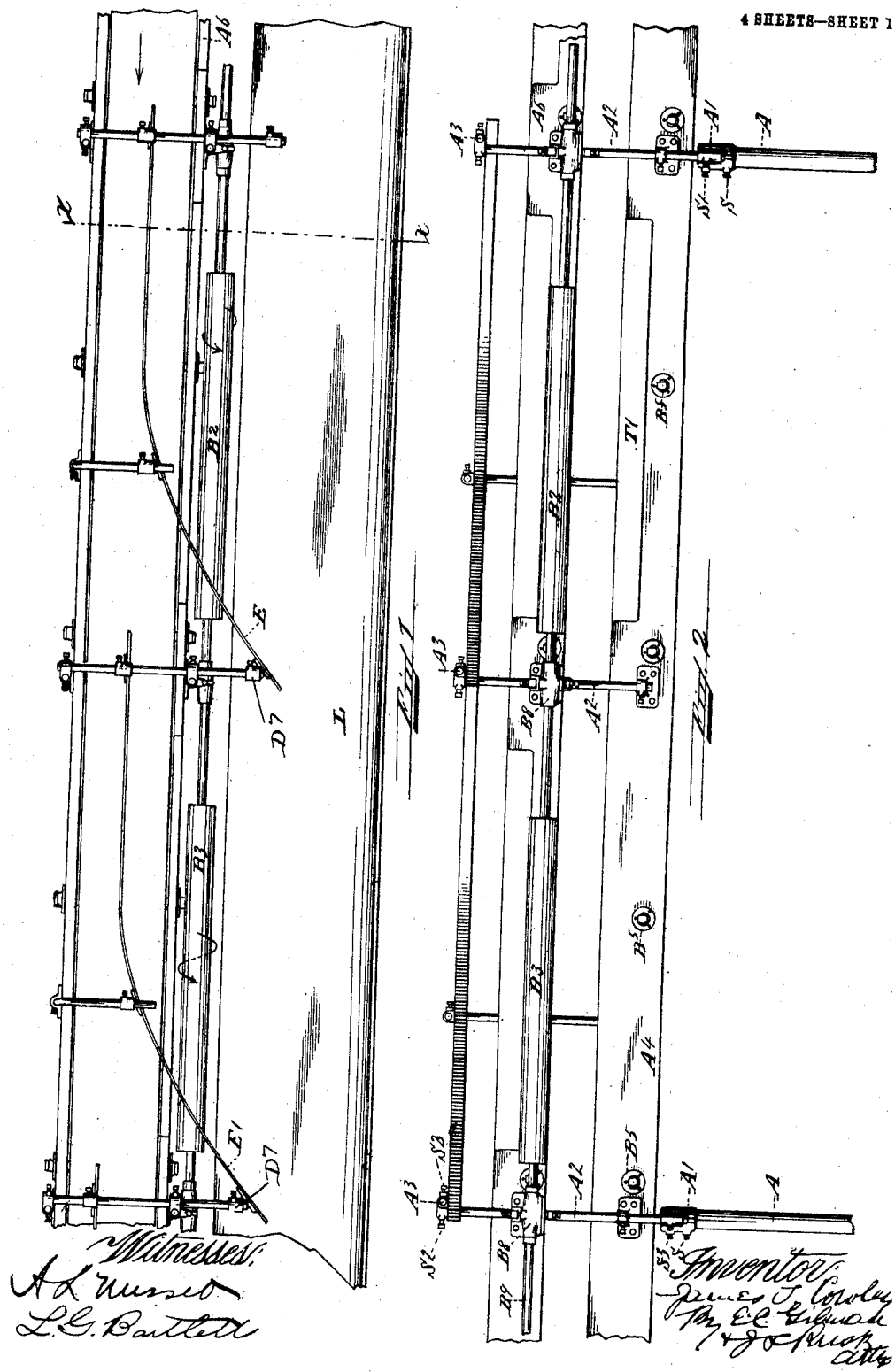

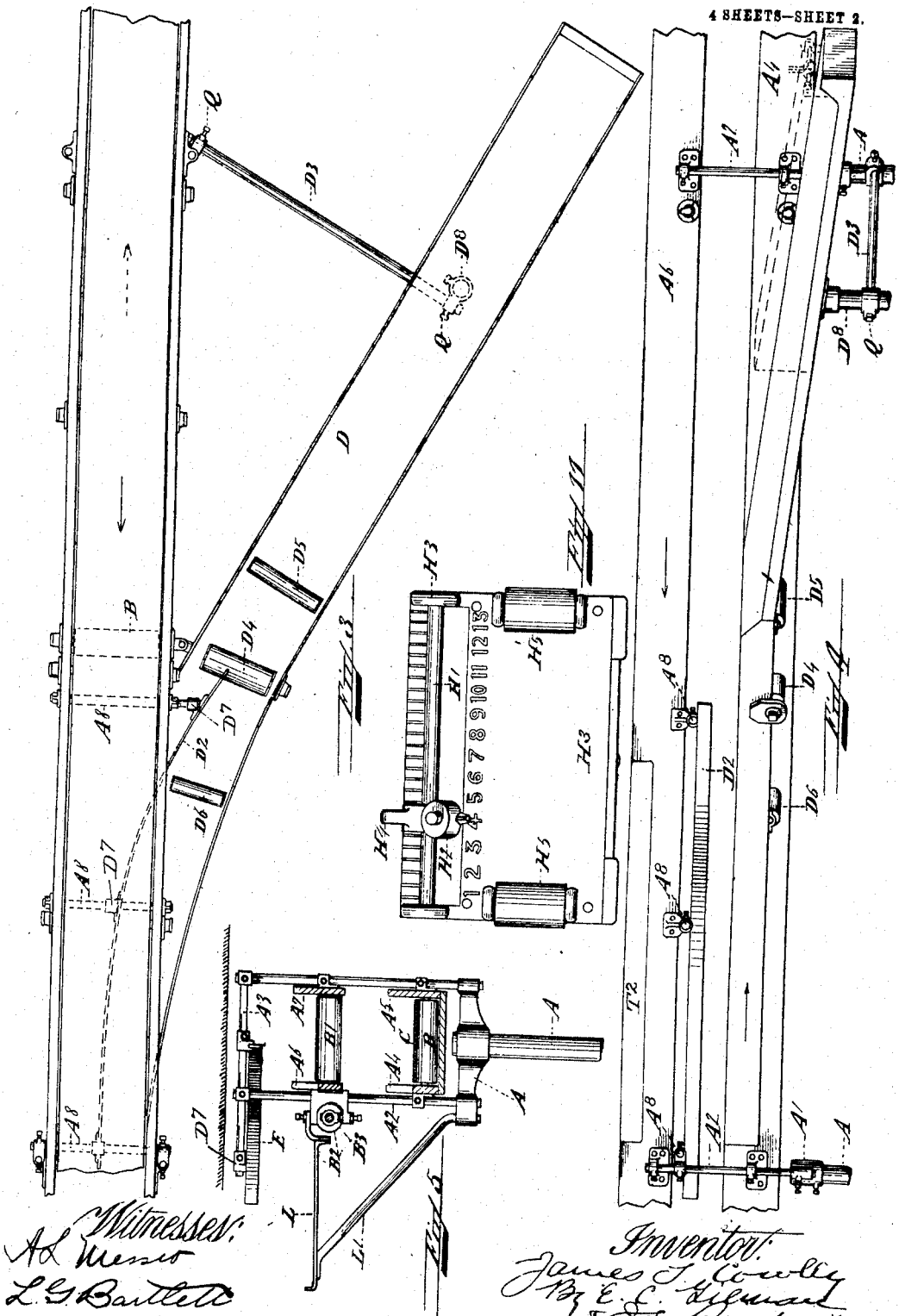

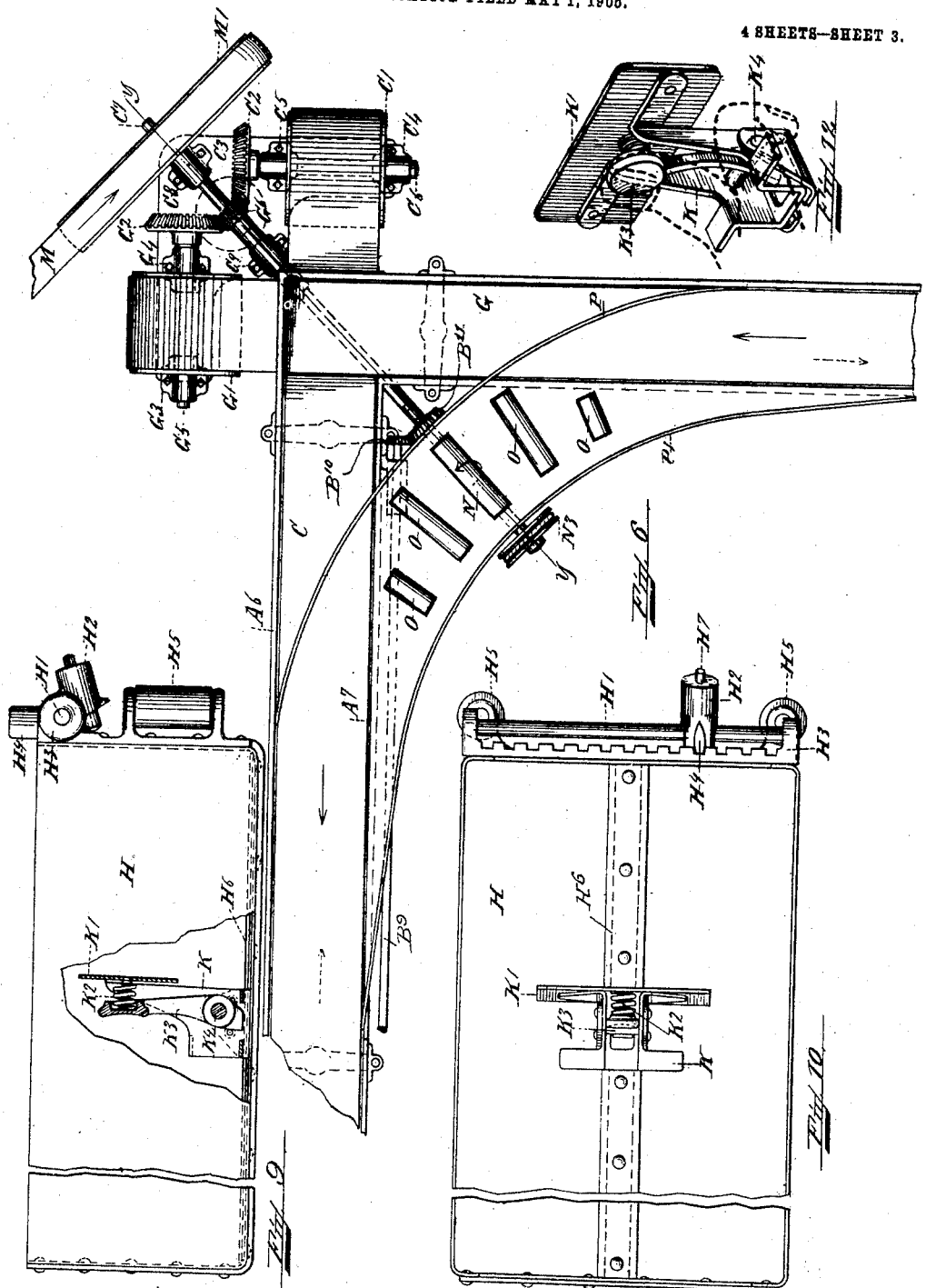

No. 866,337. PATENTED SEPT. 17, 1907.
J. T. COWLEY.
CONVEYING APPARATUS.
APPLICATION FILED MAY 1, 1905.
4 SHEETS—SHEET 4.
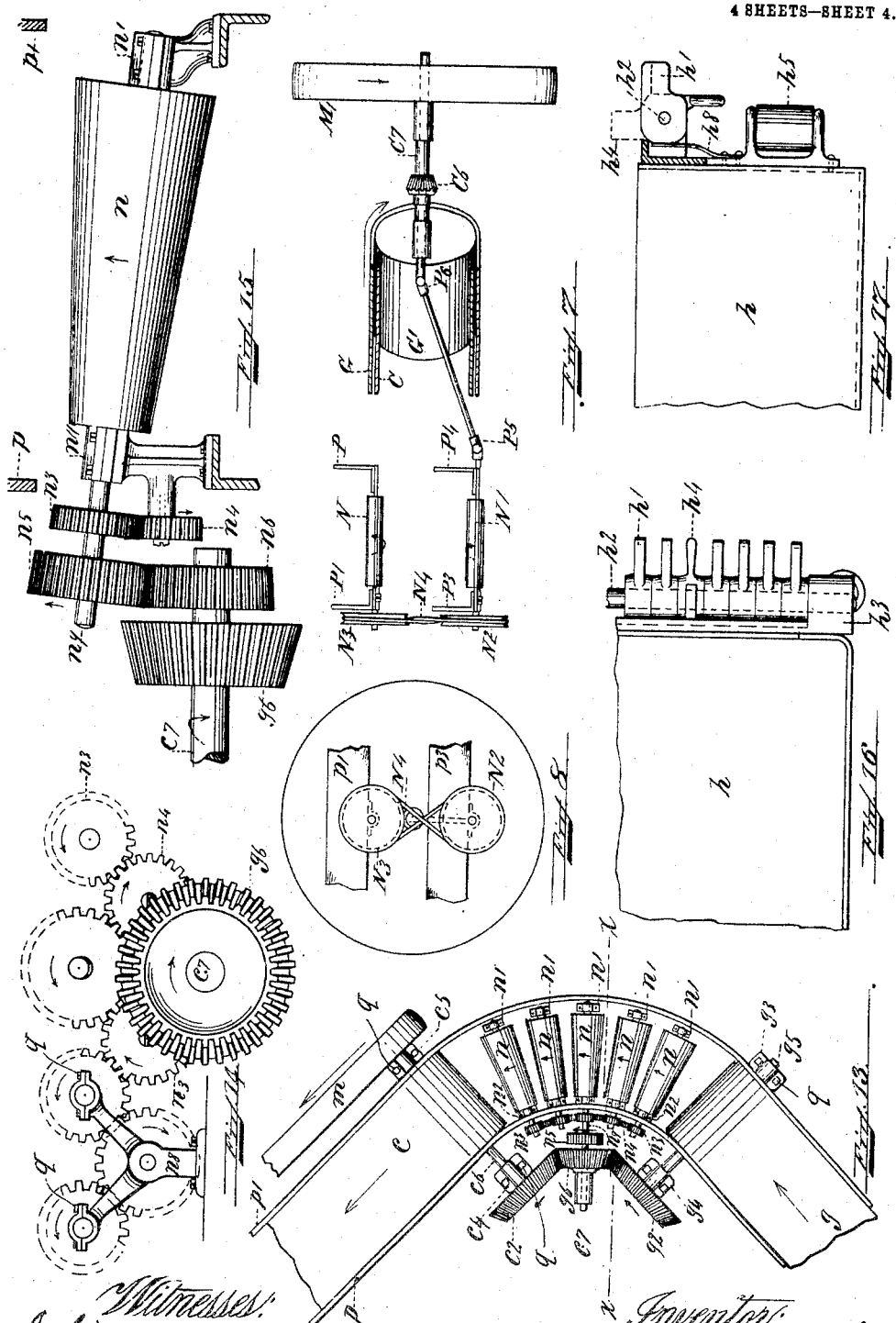

UNITED STATES PATENT OFFICE.

JAMES T. COWLEY, OF BOSTON, MASSACHUSETTS, ASSIGNOR TO LAMSON CONSOLIDATED STORE SERVICE COMPANY, OF NEWARK, NEW JERSEY, A CORPORATION OF NEW JERSEY.

CONVEYING APPARATUS.

No. 866,337.        Specification of Letters Patent.        Patented Sept. 17, 1907.

Application filed May 1, 1905. Serial No. 258,279.

*To all whom it may concern:*

Be it known that I, JAMES T. COWLEY, of Boston, in the county of Suffolk and State of Massachusetts, have invented certain new and useful Improvements in Conveying Apparatus, of which the following is a specification.

My invention relates to that class of traveling belt conveyers for supporting carriers containing letters, parcels or general merchandise.

My invention consists of a series of revolving endless sections of a conveyer so constructed, arranged and combined as to convey or despatch the said carriers from each or any of a series of sending stations located on any section of the conveyer and to side-track or switch the carriers into each or any of a series of receiving stations located thereon.

The apparatus herein described is especially adapted for the transmission of mail matter in post offices where the assorted matter is subject to delivery or exchange between each or any receiving or sending station along the line of the conveyer.

The upper portions of the endless belts are like-directionally moving and the lower portions move in the reverse direction, and I provide an angle of intersection of these endless sections with a device for driving the drums carrying the belts in the required direction.

My invention consists also in providing means for conveying or guiding the carriers around the angles from one section to another. This is accomplished by supplying the angles with curved guide rails on either side connected with the framework of the sections, and a series of guide rolls rotating within said guide rails in the direction of travel of the belt giving an impulse to the carrier in rounding a corner. These rolls are driven by a shaft intermediate two bevel gears connected with the drums thereby causing the rolls to rotate in the direction of travel of the belts. Auxiliary rolls may be geared to the driving rolls by means of intermediate gears and assume the required direction of rotation. These rolls may be of different shape, either conical or cylindrical. There is also provided for each receiving station, a switching or side tracking mechanism for diverting the carriers to their designated stations. This is accomplished by means of a switch rail at each station located in a position to engage the adjustable index clutch located on the front of the carrier which clutch can be adjusted for any station desired. Actuating rolls are also provided at each receiving station to facilitate supporting and conveying the carriers from the belts. To prevent shifting of the contents of the carrier, there is provided a spring-actuated friction slide which is longitudinally adjustable on ways in the carrier.

Numerous other important features of my invention will be hereinafter described and particularly pointed out in the claims.

In the accompanying drawings which illustrate a construction embodying my invention, Figure 1 is a plan view of a receiving station on the upper section of the conveyer. Fig. 2 is an elevation of Fig. 1 with the receiving shelf removed. Fig. 3 is a plan view of a receiving station on the lower section of the conveyer, and Fig. 4 is a side elevation of the same. Fig. 5 is a sectional view on the line X X Fig. 1. Fig. 6 is a plan view of a corner. Fig. 7 is a sectional view on the line Y Y Fig. 6. Fig. 8 is an end view of Fig. 7. Fig. 9 is a side elevation of the carrier. Fig. 10 is a plan view of a carrier. Fig. 11 is a front view of a carrier. Fig. 12 is a perspective view of an adjustable slide for holding the articles in the carrier. Fig. 13 is a modification of the corner shown in Fig. 6. Fig. 14 is an end view of the parts shown in Fig. 13 showing the gearing for like-directionally actuating the rolls. Fig. 15 is a sectional view on the line X X Fig. 13. Fig. 16 shows a modification of the carrier illustrated in plan view in Fig. 10. Fig. 17 is a modification of the carrier shown in side elevation in Fig. 9.

Like letters of reference refer to like parts throughout the several views.

The cross bar $A'$ is rigidly mounted on the standard A (Fig. 5) and rigidly fixed thereto at each end are the vertical supports $A^2$. The horizontal cross bar $A^3$ rigidly connects the top of the vertical supports $A^2$. The vertical sides or guide rails $A^4$ $A^5$ of the lower section and $A^6$ $A^7$ of the upper section are fastened to the vertical supports $A^2$ at each side. The rollers B journaled in the guide rails $A^4$ $A^5$ carry the lower section of the endless belt C. The rollers $B'$ journaled in the guide rails $A^6$ $A^7$ carry the upper or reverse moving section of the belt C. The longitudinal shaft $B^9$ is mounted in the bearings $B^8$ attached to the vertical supports $A^2$ and is geared to and driven through gears $B^{10}$ and $B^{11}$ by the corner driving device (Fig. 6). The receiving table L is fastened to the supports $A^2$ and braced by the angle rod $L'$. The rolls $B^2$ fixed to and adapted to be rotated with shaft $B^9$ in the direction indicated by arrows Fig. 1 are located at the receiving stations and are adapted to actuate the carrier from the belt to the receiving shelf L. The diverting or curved switch rails E $E'$ of the upper section (Fig. 1) and $D^2$ of the lower section (Fig. 3) are drop-fastened from the horizontal cross bars $A^3$ $A^8$ respectively by means of the angle collar braces $D^7$ fastened to the outer periphery of the curved switch rails E $E'$ and $D^2$. The receiving shelf D of the lower section (Figs. 3 and 4) is fastened to the open section of the vertical side or guide rail $A^4$ and open to communication with the belt C. The roll or actuating pulley D⁴ and the idle rolls D⁵ D⁶ are journaled in the side rails of said shelf D. The actuating or working roll D⁴ is driven by the roll B, which roll is driven by the belt C. The cross bar D³ mounted on the standard A at one end and carrying the vertical standard D⁸ mounted thereon at the other end and secured by set screws Q supports the outer end of the shelf D. The opening T² in the guide rail A⁶ (Fig. 4) and the opening T' in the guide rail A⁴ are for the purpose of allowing the placing of the carriers on the belt for transmission. The corner plate C³ (Fig. 6) carries the uprights G³ G⁴ forming bearings for the shaft G⁵ of the drum G' which drives the endless belt G. The uprights C⁴ C⁵ are mounted on the corner plate C³ at right angles to the uprights G³ G⁴ and carry the shaft C⁶ of the drum C' which drum drives the endless belt C. Beveled gears G² and C² are fixed to the shafts G⁵ and C⁶ respectively. The shaft C⁷ diagonally mounted in the uprights C⁸ C⁹ intermediate the beveled gears G² G³ carries the gear G⁶ which intermeshes and drives said gears C² and G² causing the belts C and G to travel like-directionally at equal speed rates. The curved guide rails P P' form the corner guides for the upper sections and the curved guide rails P³ P⁴ form the corner guides for the lower section. The guide roll N' (Fig. 7) is journaled in the corner guide rails P³ P⁴ and is connected to the driving shaft C⁷ by the universal joints P⁵ P⁶ causing said roll N' to rotate in the direction indicated by the arrow. The grooved pulley N² is fixed to the shaft of the roll N' and connected by a reverse belt N⁴ to a similar grooved pulley N³ mounted on the shaft of the roll N, causing said roll N to rotate in the reverse direction in bearings in the guides P P' of the upper section. The belt M driving the pulley M' supplies suitable power for actuating the said device. A modification of said corner-drive mechanism is shown in Figs. 13, 14 and 15, in which the actuated conical rolls n are mounted at equal spaced intervals in the bearings n' of the guide rails p' p which connect the endless sections c and g of the conveyer. The gears n³ mounted on the inner ends of the rolls n are connected by the intermediate gears n⁴. The bevel gear n⁵ fixed on the shaft n⁹ of the center roll intermeshes with and is driven by the bevel gear n⁶ on the shaft c⁷. The bevel gear c² mounted on the shaft c⁶ and the bevel gear g² mounted on the shaft g⁵ intermesh with and drive the intermediate gear g⁶ of the shaft c⁷ thereby imparting a like-directional motion to the rolls n², as indicated by arrows. Suitable bolts q fasten all rigid parts of said mechanism.

In Fig. 9 H represents a carrier for the articles to be transported. A friction slide (Fig. 12) for holding said articles in position consists of the vertical pressure plate K' fastened to the frame K, said frame K being longitudinally adjustable on the ways H⁶ on the bottom of said carrier. The thumb lever K³ pivoted to the frame K by the pin K⁴ and actuated by the spring K² holds the slide firmly in any desired position. A notched face-plate H³ is fixed to the front of the carrier H (see Fig. 10) and the spindle H' is fixed at each end of the extensions of each frame. The adjustable clutch H² is designed to slide at will on the spindle H' and to engage any one of the notches in said face plate H³. The spring actuated pin H⁷ pressing against the face of the carrier holds the clutch in the desired notch, each notch on said face plate H³ representing a station which is so indicated by a numeral thereon. The vertical rolls H⁵ mounted in bearings on each side of the face plate H³ are designed to guide the carrier freely around the curve. The lip H⁴ located on top of the clutch H² engages a switch rail at the station designated by said clutch.

A modification of the adjustable switching mechanism is shown in Figs. 16 and 17. A series of clutches each representing a station are adjustably mounted on the spindle h². Flat springs h⁸ are located on the face plate h³ behind each clutch and engage a flat surface thereon. Any one clutch indicating a desired station may be thrown into position as represented by the dotted lines h⁴ from the initial position h'.

In the operation of this mechanism, the parcels or letters are placed in the carrier H and the thumb pressing the top of the lever K² pushes the slide K into position holding the said parcels or letters firmly in place. The thumb is then removed and the lever K² released locking the slide K in position. The adjustable clutch H² on the face plate H³ of the carrier H is pressed downward until released from the notches and then moved to either side until opposite the notch bearing the number of the desired station. The pressure is then released and the clutch locks into position. If the station designated is situated to the left of the operator, the carrier is then placed through the opening T² of the upper section and upon the belt C which is traveling in that direction. If the station should be to the right, the carrier is put through the opening T' of the lower section and upon that portion of the belt which is traveling in the reverse direction. If the carrier is required to turn a corner as shown in Fig. 6, the guide rolls H⁵ engage the outer curved guide rail and the carrier is diverted on to the supporting or idle rolls O. The belt still impels the carrier over the said rolls O until it passes onto the actuating roll N which now drives the carrier completely round the corner and upon the belt of the next endless section. If the receiving shelf D (Fig. 3) should be the section indicated by the tongue of the index clutch H² on the carrier H, the lip H⁴ would engage the switch rail D² diverting the carrier H on to the idle or supporting roll D⁶ thence upon the actuating roll D⁴ over the supporting roll D⁵ and on to the shelf D. If the carrier is consigned to either of the stations on shelf L, the index clutch is set to engage either of the switch rails E or E', and the carrier diverted by either of said rails is moved out upon the shelf L by the actuating rolls B² or B³. The contents of the carrier may then be removed and the carrier returned to the sender by being placed on the belt traveling in that direction.

Having thus described the nature of my invention and set forth a construction embodying the same, what I claim as new and desire to secure by Letters Patent of the United States is:

1. In a conveyer, a horizontal frame, means supporting said frame, troughing rolls or idlers journaled within said frame, drums mounted at each end of said frame, an endless belt carried by said drums and supported by and traveling on said rolls and adapted to support and convey carriers thereon, and graduated stationary means for switching carriers laterally from said belt.

2. In a conveyer, a horizontal frame, means supporting said frame, troughing rolls or idlers journaled within said frame, drums mounted on each end of said frame, an endless belt carried by said drums and supported by and traveling on said rolls and adapted to support and convey carriers thereon, graduated stationary means for switching said carriers laterally, and a shelf or receiving station adapted to receive said carriers.

3. In a conveyer, a horizontal frame, means supporting said frame, troughing rolls or idlers journaled within said frame, drums mounted on each end of said frame, an endless belt carried by said drums and supported by and traveling on said rolls and adapted to support and convey carriers thereon, means for switching said carriers laterally from said belt, a shelf or receiving station adapted to receive said carriers, and means for actuating said carriers from said belt to said shelf or receiving station.

4. In a conveyer, a horizontal frame, means supporting said frame, troughing rolls or idlers journaled within said frame, drums mounted on each end of said frame, an endless belt carried by said drums and supported by and traveling on said rolls and adapted to support and convey carriers thereon, means for switching said carriers laterally from said belt, a shelf or receiving station adapted to receive said carriers, and means for actuating said carriers from said belt to said shelf or receiving station and operated by the belt-driving mechanism.

5. In a conveyer, as herein described, the combination of a plurality of endless belt-conveyer sections mounted on drums in said sections and adapted to support and convey carriers thereon, troughing rolls supporting said belts, switch rails adapted to engage a clutch or guide on said carriers and divert said carriers from the belts, a receiving station adapted to receive said carriers, and guiding rolls connected with said troughing rolls and driven by said belts for conveying said carriers from said belts to said receiving station.

6. In a conveyer, a horizontal frame, means supporting said frame, troughing rolls or idlers journaled within said frame, drums mounted on each end of said frame, an endless belt carried by said drums and supported by and journaled on said rolls and adapted to support and convey carriers thereon, means for switching said carriers laterally from the upper side of said belt, a shelf or receiving station adapted to receive said carriers, means for actuating said carriers from said belt to said shelf or receiving station, and means driven by said belt for actuating said carriers from the lower side of said belt to a receiving station.

7. In a conveyer, a plurality of endless belt sections adapted to support and convey carriers thereon, means for supporting said belt sections, stationary switching guides at the stations for diverting said carriers from said belts to said stations, and switching mechanism on said carriers adapted to be adjusted thereon to engage with the diverting switching guides at any desired station.

8. In a conveyer, an endless belt conveyer adapted to support and convey carriers thereon, means for supporting said belt conveyer, a stationary guide for diverting said carriers from said belt to a receiving station, and switching mechanism on said carrier for engaging said guide.

9. In a conveyer, an endless belt conveyer adapted to support and convey carriers thereon, means for supporting said belt conveyer, a stationary guide for diverting said carriers from said belt to a receiving station, and adjustable switching mechanism on said carrier.

In testimony whereof, I have signed my name to this specification in the presence of two subscribing witnesses, this 20th day of April A. D. 1905.

JAMES T. COWLEY.

Witnesses:
L. G. BARTLETT,
A. L. MESSER.